United States Patent
Schauble

(10) Patent No.: US 6,972,668 B2
(45) Date of Patent: Dec. 6, 2005

(54) TAMPER-EVIDENT USE-INDICATING ODOMETER AND ENGINE-TIMER

(76) Inventor: Richard Egon Schauble, 114 Oakmoor Place SW., Calgary, Alberta (CA) T2V 4A3

( * ) Notice: Subject to any disclaimer, the term of this patent is extended or adjusted under 35 U.S.C. 154(b) by 97 days.

(21) Appl. No.: 10/669,316

(22) Filed: Sep. 25, 2003

(65) Prior Publication Data

US 2004/0078124 A1    Apr. 22, 2004

(30) Foreign Application Priority Data

Oct. 18, 2002   (CA)   .................................... 2408979

(51) Int. Cl.[7] .............................................. B60Q 1/00
(52) U.S. Cl. .................. 340/438; 340/439; 701/29; 701/35
(58) Field of Search ................. 340/438, 439, 340/525, 459, 461, 462, 463; 701/29, 30, 701/35; 702/187

(56) References Cited

U.S. PATENT DOCUMENTS

| | | | |
|---|---|---|---|
| 4,501,005 A | 2/1985 | Miller | |
| 4,593,263 A | 6/1986 | Peckworth | |
| 4,843,578 A * | 6/1989 | Wade | 702/142 |
| 5,074,144 A | 12/1991 | Krofchalk et al. | |
| 5,819,201 A | 10/1998 | DeGraaf | |
| 5,857,159 A | 1/1999 | Dickrell et al. | |
| 5,862,500 A | 1/1999 | Goodwin | |
| 5,970,436 A | 10/1999 | Berg et al. | |
| 6,115,655 A * | 9/2000 | Keith et al. | 701/35 |
| 6,490,543 B1 * | 12/2002 | Jaw | 702/184 |
| 6,701,234 B1 * | 3/2004 | Vogelsang | 701/35 |

* cited by examiner

Primary Examiner—Anh V. La
(74) Attorney, Agent, or Firm—Antony C. Edwards

(57) ABSTRACT

The present invention relates generally to the provision in an automobile of a tamper-evident combined Odometer and Engine Run-time recorder, optionally with display of average speed or indication of type of vehicle use.

17 Claims, 1 Drawing Sheet

TAMPER-EVIDENT USE-INDICATING ODOMETER AND ENGINE-TIMER

CROSS REFERENCE TO RELATED APPLICATION

This application claims priority from Canadian Patent Application No. 2,408,979 filed Oct. 18, 2002 entitled Tamper-Evident Use-Indicating Odometer and Engine-Timer.

FIELD OF THE INVENTION

This invention relates generally to the field of instrumentation and measurement, and display of useful historical operating information in automobiles and similar vehicles, and the provision of such information in a simple, cost-effective, reliable and trustworthy way to end-users and others.

BACKGROUND OF THE INVENTION

It is well-known in consumer automobiles to provide tamper-evident odometers which display a recording of total vehicle mileage since odometer replacement, thus giving the vehicle's owner or subsequent purchaser some idea of the mileage on the vehicle and thus of wear and expected remaining life-span in very broad terms of the vehicle's main components, and thereby assist in the timing of maintenance procedures and the rough value of the vehicle based upon its prior use. Modern odometers are provided which have rolling cylinders with numbers printed thereupon which align themselves properly in normal use, but misalign when tampered with by, for example, being "rolled back" to falsify the apparent mileage on the vehicle.

It is also well-known in industrial equipment and aircraft, for example, to provide what is commonly referred to as a "Hobbs Meter", which in some manner measures and records engine run-time on a cumulative basis. This is useful in the case of some equipment in calculating charges for use on a "per-hour" of actual use basis, and to measure the time between mandatory service of aircraft in a highly safety-regulated setting, as in modern passenger aircraft.

In modern aircraft, given mandatory service cycles which are measured by elapsed engine-use time, the approximate value of the aircraft may be seriously affected by the time-remaining until major service or parts replacement, the cost of which is typically amortized over the expected time between service.

In U.S. Pat. No. 5,970,436 Berg ('436) is described a system of detecting and reporting equipment utilization for the purpose of reporting information on "use hours" by correlating a timer with a motion sensor to record "time in motion". The aim of Berg's '436 patent is to differentiate between idle engine hours and engine hours with equipment in motion in order to better schedule maintenance and to better charge for utilization of heavy equipment in the materials handling realm such as large scrapers, tractors, earthmovers and the like. The method and equipment provided is complex, and while perhaps affordable for the measurement of heavy industrial equipment, is too expensive and complex for a consumer-targeted automotive application of mass distribution, for example.

In U.S. Pat. No. 5,862,500 Goodwin ('500) is described a trip data recorder and data manipulation system using electronic pulses generated and measured from the drive-train of the vehicle which also records date, start time, distance traveled, and stop time of a vehicle during a particular trip. While useful for some settings, the capture of this type of data and its manipulation for particular trips does not provide information about the over-all use of the vehicle over its entire life, and thus approaches a different problem.

In U.S. Pat. No. 5,857,159 Dickrell et al. ('159) is described a complex system of recording a variety of vehicle operating information and characteristics, storing that information, and then displaying the information in meaningful ways. The system is comprehensive, complex, and requires large storage and competent computational power on-board. '159 may be useful for some vehicle management and maintenance systems requirements, but it is too complex and requires more computation and storage, as well as remote sensing and data-gathering sub-systems than would be required for a simple system of mass adoption in consumer automotive settings.

In U.S. Pat. No. 5,819,201 DeGraaf ('201) is described a navigation system which measures routes, distance traveled, trip information and whatnot, as well as service intervals calculated from trip information, and then provides reminders and directions using navigation subsystems to nearest service facilities. While useful, this invention attacks a different problem than the instant applicant's invention, and gives no indication of overall vehicle condition.

In U.S. Pat. No. 5,074,144 Kofchalk et al. ('144) is described a system of recording and displaying operating performance of a vehicle over time, including measurements of manifold pressure, vehicle speed, engine operating speed and trip-over events when any of those things is sensed to be outside of a pre-set operating range. Total operating time and total idle time is also displayed to the operator in real-time. The aim of '144 is to measure the performance of a vehicle and its components (engine) while at the same time measuring the performance of its operator, in order to optimize driver performance and protect vehicles from use by operators outside of the vehicle's intended operating parameters, thus attempting to avoid uses which would damage the vehicle or cause inordinate amounts of wear and thus higher maintenance and fuel-use costs. The aim and method of attacking the aim are quite different from the purpose of the applicant's invention.

In U.S. Pat. No. 4,593,263 Peckworth ('263) is provided a mileage recording and service reminding accessory for a shared-use vehicle in order to ease the accounting burden and gather evidence useful for management of the share-use vehicle amongst its various users and uses in order to appropriately allocate costs. As such, the instrument attacks a different purpose, and gathers different information than that of the applicant's invention.

In U.S. Pat. No. 4,501,005 Miller ('005) is disclosed an elapsed mileage indicator, which indicates vehicle maintenance reminders at pre-selected elapsed mileages traveled by the vehicle, using engine ignition pulses as its input, thus measuring engine usage times and approximating mileage by computation therefrom. While the invention is interesting and undoubtedly useful, it again attacks a different problem from that solved by the applicant's invention.

It is, therefore, desirable to provide a system which overcomes the failings of the inventions cited above, and over the prior art by providing a tamper-evident measurement or set of measurements which taken together can give some relatively useful information about both overall vehicle use and some indication of type of use, in a simple, consumer-oriented, mass-market automotive setting.

SUMMARY OF THE INVENTION

It is an object of the present invention to obviate or mitigate at least one disadvantage of prior art and to provide a tamper-evident display to the vehicle's user of a reliable measurement of historical gross vehicle mileage (distance traveled), historical gross engine "on" time (time running), and optionally, an indication of type of use by reference to a calculated average lifetime vehicle speed under power (distance traveled divided by engine time running) to indicate roughly how the vehicle might have been used.

Example #1

Two identical vehicles, both with 50,000 kms on their odometers. Without the operating hour meter, both of these vehicles would conventionally be of the same re-sale value. However, one of these vehicles has 1,000 operating hours with 50,000 kms traveled which amounts to 50 km per operating hour. The other vehicle also has 50,000 kms but only 600 operating hours with an average of 83.3 kms per operating hour. The present invention would simply disclose a vehicle's history more accurately, thus indicating the car with the 600 operating hours would command a higher re-sale price.

Example #2

Two identical cars, both 3 years old, the first showing 50,000 kms on its odometer, the second showing 40,000 kms on its odometer.

At a glance, the second car would be worth more, but if you had a combination odometer and operating hour meter according to the present invention, this would disclose more information, for example:

The first car with 50,000 kms has 600 operating hours.

The second car with 40,000 kms has 1000 operating hours.

This information would indicate that the first car was more highway driven while the second car was driven more in the city or for short distances. Consequently, this would indicate that the second car may not be worth more than the first car for re-sale as a used car.

In a first aspect, the present invention provides a tamper-evident readout of overall distance traveled (odometer reading).

In a further embodiment, there is provided in addition a tamper-evident readout of overall engine time running (Hobbs meter reading).

In further aspect, the present invention provides an indicator of the type of use of the vehicle over its lifetime, by inference from a calculated average lifetime vehicle speed under power (distance traveled divided by engine time running).

Other aspects and features of the present invention will become apparent to those ordinarily skilled in the art upon review of the following description of specific embodiments of the invention in conjunction with the accompanying figures.

DETAILED DESCRIPTION OF EMBODIMENTS OF THE INVENTION

Figure 1:
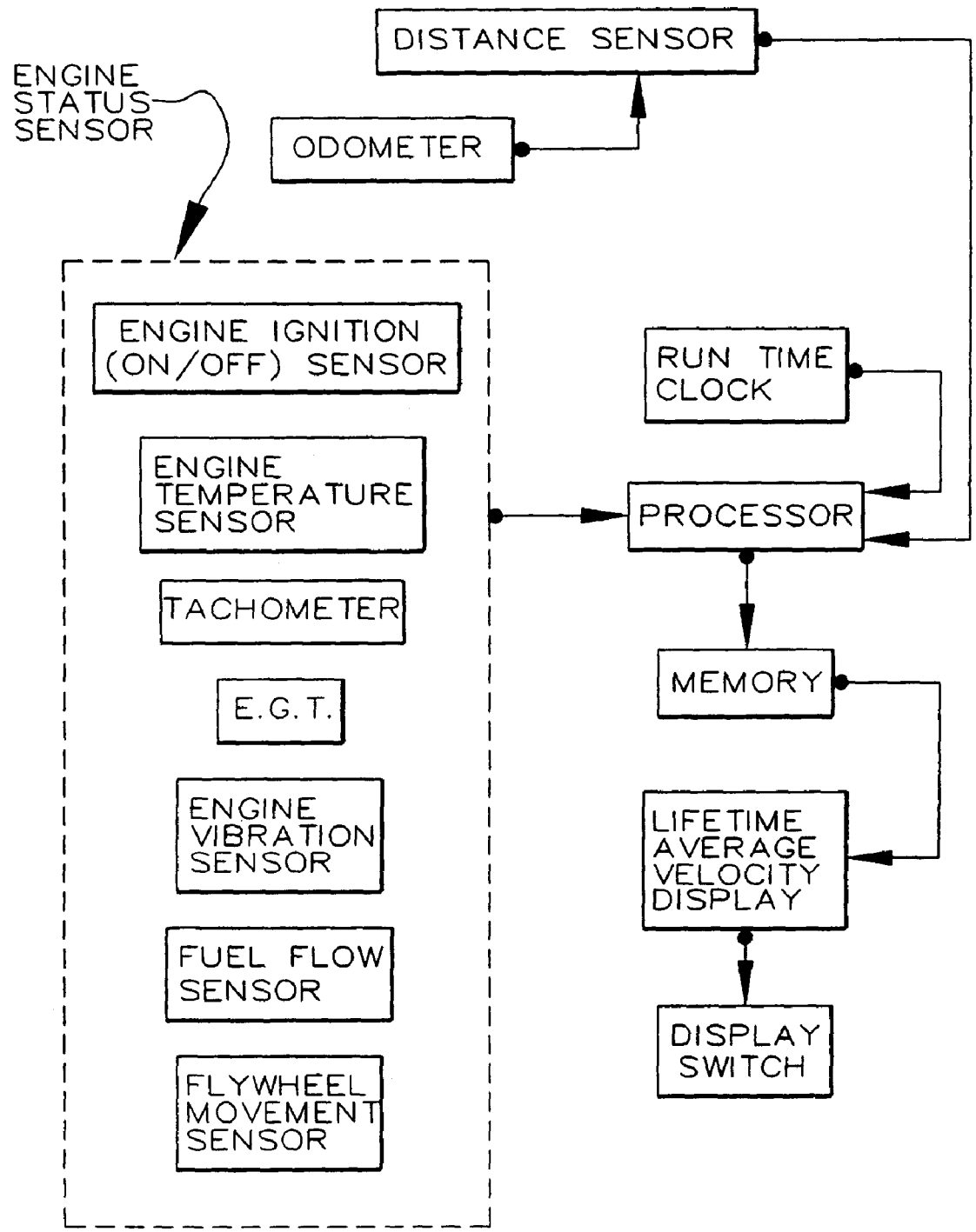
FIG. 1 is a diagrammatic view of the operation of the vehicle gauge according to the present invention.

Generally, the present invention provides a method and system to provide to a vehicle's user a reliable measurement of historical gross vehicle mileage (distance traveled), historical gross engine "on" time (time running), and optionally, an indication of type of use by reference to a calculated average lifetime vehicle speed or for example only while accelerating or under power (distance traveled divided by either engine time running, time-under acceleration, or time-under-power) to indicate roughly how the vehicle might have been used.

The system can be provided in an instrument which is added after manufacture, or during manufacture, of a vehicle.

The system uses information generally collected by currently mandatory vehicle standards (tamper-evident mileage measurement and display) and easily gathered and stored operating information (engine running time, which can be inferred from existing tachometer readings over zero, for instance, or from things like the ignition system's status, which is measured in modern vehicles for other purposes; the distance traveled, and the time that an inference that the engine is running can be made and can be counted using trite and well-known, robust, low-power clock, memory, and storage systems). Displays can be programmed into existing digital dashboard displays or provided by adding no more than 3 simple displays (time, distance, average speed). It may be useful to provide a further method of measuring utilization on a trip-by-trip basis.

The information provided need not be sophisticated nor complicated. Tamper-evident and perhaps tamper-resistant systems would be preferred to enhance system and information trustworthiness for the user.

The benefit derived by a user is that there is some reliable and trustworthy, simple to understand and read, information from which inferences may be made about an equipped vehicle's historical prior use.

The average speed information may be constantly calculated and displayed, but the applicant envisions as a preferred embodiment a single digital display with a switch or button which toggles the display between, for example, readings of distance, engine running time in hours, and calculated average distance per hour of running time, with some indicator to tell the user the units of measurement being displayed. A further indication may be provided of whether the average distance per hour of engine run time or of engine time while accelerating or under power indicates a particular type of overall vehicle use pattern to date (such as "high speed" or "very low speed" or "mainly idle" or "mainly highway" or "mainly city", based upon statistical norms of such use. This may assist in assessing a value for the particular vehicle at that particular time. The display may also be tamper-resistant and preferably tamper-evident. The digital nature of the display may be by electronics such as LED or similar types of display, or rolling dials with numerical values imprinted, or otherwise.

As seen in FIG. 1, the vehicle gauge according to the present invention may include:

a) means to measure distance travelled by the vehicle, (exemplified by the "odometer" or "distance sensor")

b) mains to aggregate and store total distance travelled by the vehicle over its lifetime, (exemplified by the cooperating "processor" and "memory")

c) means to sense vehicle engine status as running or not running, (exemplified by the "engine status sensor" which may include one or more of the individual sensors labelled with the dotted outline)

d) means to infer and record aggregate lifetime engine run-time hours, (exemplified by the cooperating "run-time clock", "processor" and "memory")

e) means to calculate average lifetime vehicle speed, wherein the average lifetime vehicle speed only includes speeds obtained by the vehicle (again the cooperating processor and memory for dividing the total distance travelled by the aggregate run-time) while the vehicle engine is running, and f) means to update and store average lifetime vehicle speed (exemplified by the "velocity display").

The means to measure, aggregate and store distance travelled by the vehicle may be a conventional odometer providing digital information as its output. The means to sense vehicle engine status as running or not running is chosen from among: ignition information supplied within the engine management systems, engine tachometer readings above a threshold such as zero, non-zero, above-idle etc., engine temperature readings in operating range, produced exhaust gas data supplied within the engine management systems, engine vibration sensor data, fuel flow sensor data, flywheel movement sensor data. All of the sensors may provide a digital output to the processor.

The means to infer and record aggregate lifetime engine run-time hours may be or include a process comprising the steps of:

a) sensing engine status change from not-running to running, b) recording start time data from clock time, c) sensing engine status change from running to not-running, d) recording end time data from clock time, e) subtracting engine start time from engine end time to obtain total run time for that cycle, f) adding total run time for that cycle to total run time of all prior cycles from memory to obtain new total run time, and g) replacing old total run time with newly obtained total run time.

The means to infer and record aggregate lifetime engine run-time hours may include:

a) means for communication from engine status sensing means to a recorder, b) means for communications from a clock to the recorder, c) a recorder for recording start time when the sensor communicates the engine's status has changed from not-running to running, and for recording end time when the sensor communicates the engine's status has changed from running to not-running, d) a calculator which subtracts start time from end time and stores the resulting cycle run-time, and e) a data store which accumulates life-time engine run-time.

The means of calculating the average lifetime vehicle speed may include the step of dividing the output of the means to infer and record aggregate lifetime engine run-time hours by the output of the means measure, aggregate and store distance travelled by the vehicle and the calculation's result is provided to the Lifetime Average Velocity display. The display include a digital display and/or a user interface, such as a button or similar input device where the user interface permits the user to toggle the display between displaying aggregate lifetime engine run-time, aggregate lifetime vehicle distance travelled, and average lifetime vehicle speed. In other embodiments any part or all of this information may be retrieved or digitally down-loaded from the processor in cooperation with the memory.

The display or retrieved information may also provide an indication to the end user, based upon the average lifetime vehicle speed, that the vehicle's lifetime use has been "mainly idled", "driven at high speed", "mainly highway", "mainly city" or similar indicators of vehicle use.

The processor may also calculate the average lifetime vehicle speed and compare the speed with a pre-set range of speeds wherein a first pre-set range of speed indicates vehicle use as predominantly highway use, and wherein a second pre-set range of speed indicates vehicle use as predominantly city use.

The sensors and/or processor may also provide a means to sense when the engine is accelerating the vehicle or otherwise under load, means to record and store cumulatively total acceleration or load time of the engine, and means to record and store, for later reading or retrieval of, average vehicle speed during the acceleration or load time, whereby an end user may determine whether the vehicle use while the engine was under load, for example accelerating, was mainly, for example, highway use or mainly city use.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A vehicle gauge comprising:
   a) means to measure distance travelled by the vehicle,
   b) means to aggregate and store total distance travelled by the vehicle over its lifetime,
   c) means to sense vehicle engine status as running or not running,
   d) means to infer and record aggregate lifetime engine run-time hours,
   e) means to calculate average lifetime vehicle speed, wherein said average lifetime vehicle speed only includes speeds obtained by the vehicle while the vehicle engine is running,
   f) means to update and store average lifetime vehicle speed.

2. The gauge of claim 1 where the means to measure, aggregate and store distance travelled by the vehicle is a conventional odometer providing digital information as its output.

3. The gauge of claim 1 where the means to sense vehicle engine status as running or not running is chosen from among: ignition information supplied within the engine management systems, engine tachometer readings above a threshold, engine temperature readings in operating range, produced exhaust gas data supplied within the engine management systems, engine vibration sensor data, fuel flow sensor data, flywheel movement sensor data.

4. The gauge of claim 2 where the means to infer and record aggregate lifetime engine run-time hours includes a process comprising the steps of:
   a) sensing engine status change from not-running to running,
   b) recording start time data from clock time,
   c) sensing engine status change from running to not-running,
   d) recording end time data from clock time,
   e) subtracting engine start time from engine end time to obtain total run time for that cycle, f) adding total run time for that cycle to total run time of all prior cycles from memory to obtain new total run time, and g) replacing old total run time with newly obtained total run time.

5. The gauge of claim 1 wherein the means to infer and record aggregate lifetime engine run-time hours comprises:
   a) means for communication from engine status sensing means to a recorder,
   b) means for communications from a clock to the recorder,
   c) a recorder for recording start time when the sensor communicates the engine's status has changed from not-running to running, and for recording end time when the sensor communicates the engine's status has changed from running to not-running,
   d) a calculator which subtracts start time from end time and stores the resulting cycle run-time, and
   e) a data store which accumulates life-time engine run-time.

6. The gauge of claim 4 where the means to infer and record aggregate lifetime engine run-time hours provides digital information as its output.

7. The gauge of claim 1 where the means of calculating the average lifetime vehicle speed comprises the step of:
   dividing the output of the means to infer and record aggregate lifetime engine run-time hours by the output of the means measure, aggregate and store distance travelled by the vehicle and the calculation's results is provided to the display.

8. The gauge of claim 1 where the display comprises:
   a) a digital display;
   b) a user interface, such as a button or similar input device and the user interface permits the user to toggle the display between displaying aggregate lifetime engine run-time, aggregate lifetime vehicle distance travelled, and average lifetime vehicle speed.

9. The gauge of claim 8 where the display also provides an indication to the end user, based upon the average lifetime vehicle speed, that the vehicle's lifetime use has been "mainly idled", "driven at high speed", "mainly highway", "mainly city" or similar indicators of vehicle use.

10. The gauge of claim 1 where the gauge is tamper-evident.

11. The gauge of claim 1 where the gauge is tamper-proof.

12. The gauge of claim 3 wherein the threshold is zero rpm.

13. The gauge of claim 3 wherein the threshold is non-zero rpm.

14. The gauge of claim 3 wherein the threshold is above-idle rpm.

15. The process of claim 4 further comprising the steps of calculating said average lifetime vehicle speed and comparing said speed with a pre-set range of speeds wherein a first pre-set range of speed indicates vehicle use as predominantly highway use, and wherein a second pre-set range of speed indicates vehicle use as predominantly city use.

16. The gauge of claim 1 further comprising means to sense when the engine is accelerating the vehicle, means to record and store cumulatively total acceleration time of the engine while accelerating the vehicle, and means to record and store, for later reading of, average vehicle speed during the acceleration time, whereby an end user may determine whether the vehicle use while the engine was under load due to acceleration was mainly highway use or mainly city use.

17. The process of claim 15 further comprising the steps of sensing when the engine is accelerating the vehicle, recording and storing cumulatively total acceleration time of the engine while accelerating the vehicle, and recording and storing, for later reading of, average vehicle speed during the acceleration time, whereby an end user may determine whether the vehicle use while the engine was under load due to acceleration was mainly highway use or mainly city use.

* * * * *